(12) United States Patent
Sahita et al.

(10) Patent No.: US 7,440,461 B2
(45) Date of Patent: Oct. 21, 2008

(54) METHODS AND APPARATUS FOR DETECTING PATTERNS IN A DATA STREAM

(75) Inventors: Ravi Sahita, Beaverton, OR (US); David Durham, Hillsboro, OR (US); Priya Rajagopal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 959 days.

(21) Appl. No.: 10/744,709

(22) Filed: Dec. 23, 2003

(65) Prior Publication Data

US 2005/0135380 A1 Jun. 23, 2005

(51) Int. Cl.
*H04L 12/28* (2006.01)
(52) U.S. Cl. .................................. 370/395.32
(58) Field of Classification Search .............. None
See application file for complete search history.

(56) References Cited

U.S. PATENT DOCUMENTS

| 5,511,159 | A | | 4/1996 | Baker et al. |
| 5,627,748 | A | * | 5/1997 | Baker et al. ............. 715/210 |
| 5,850,516 | A | | 12/1998 | Schneier |
| 6,493,698 | B1 | | 12/2002 | Beylin |
| 7,002,965 | B1 | * | 2/2006 | Cheriton ............. 370/395.32 |
| 7,072,876 | B1 | * | 7/2006 | Michael ..................... 706/45 |
| 2002/0102545 | A1 | * | 8/2002 | Shibuya ..................... 435/6 |
| 2004/0117396 | A1 | * | 6/2004 | Avadhanam et al. ........ 707/101 |

OTHER PUBLICATIONS

Mark Nelson, "Fast String Searching With Suffix Trees", Dr. Dobb'Journal, Aug. 1996, XP-002323499, pp. 1-9. Retrieved from Internet: URL:<http://www.dogma.net/mark/articles/siffixt/suffixt.html> [Retrieved on Apr. 5, 2005] the whole document.

James A. Storerm "Lossless Image Compression Using Generalized LZ1-Type Methods", Data Compression Conference, 1996. DCC '96. Proceedings Snowbird, UT, USA, Mar. 31-Apr. 3, 1996, Los Alamitos, CA, USA, IEEE Comput. Soc., US, Mar. 31, 1996, pp. 290-299, XP010156570.

* cited by examiner

*Primary Examiner*—Kwang B. Yao
*Assistant Examiner*—Juvena Loo
(74) *Attorney, Agent, or Firm*—Buckley, Maschoff & Talwalker LLC

(57) ABSTRACT

In some embodiments, a method includes generating a prefix trie for a set of patterns, generating a suffix trie for the set of patterns, and establishing respective links between nodes of the prefix trie and respective corresponding nodes of the suffix trie. In some embodiments, a method includes adding a suffix to a suffix tree, so that the suffix (which is at least a portion of a pattern) is represented in the tree by a path that begins at a first node and ends at a second node, and associating with at least the first node and the second node a pattern identifier that identifies the pattern.

18 Claims, 14 Drawing Sheets

METHODS AND APPARATUS FOR DETECTING PATTERNS IN A DATA STREAM

BACKGROUND

There is an increasing need to scan the payloads of packets, in addition to or instead of scanning packet headers, to detect patterns in the data contained in the packets. Applications of this approach, generally referred to as deep-packet examination, may include worm and virus scanning, augmented intrusion detection, context- and/or protocol-aware firewalling, information protection, load balancing, or delivering network services on demand.

Since packets may be, and frequently are, received out of order, it can be particularly challenging to detect patterns that are fragmented across packets. Reassembly of the packet sequence at the point of examination to aid in detecting fragmented patterns presents significant memory and/or processing burdens, particularly when the number of flows to be monitored is potentially very large.

DETAILED DESCRIPTION

Figure 1:
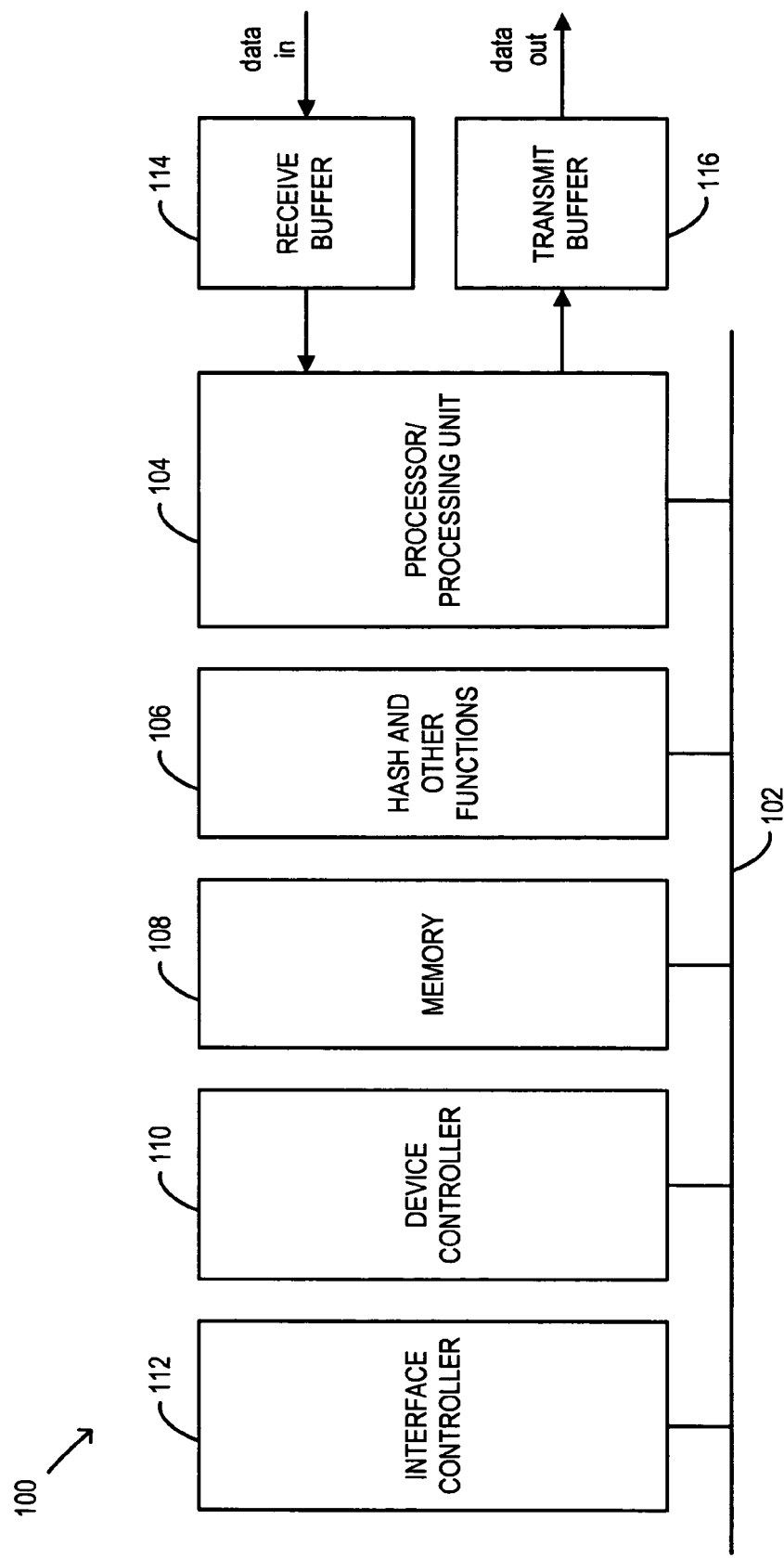
FIG. 1 is a block diagram that illustrates a network controller provided according to some embodiments.

FIG. 1 is a block diagram that illustrates a network controller 100 provided according to some embodiments. The network processor 100 includes a bus 102, and also includes a processor 104, a hash/other functions block 106, one or more memory components 108, a device controller 110 and an interface controller 112, all connected to the bus 102. The network processor 100 further includes a receive buffer 114 coupled to the processor 104 to receive and temporarily store incoming data packets, and a transmit buffer 116 coupled to the processor 104 to temporarily store outbound data packets.

In some embodiments, the processor 104 may be formed of a number of parallel processing micro-engines, which are not separately shown. The processor 104 will interchangeably be referred to sometimes as a "processing unit". The processor 104 may perform packet examination, as described below, in addition to other functions relative to incoming and/or outbound packets.

The hash/other functions block 106 may perform hash calculations and may handle input/output and/or other functions.

The memory components 108 may serve as program and/or working memory for the processor 104.

The device controller 110 may perform over-all control functions for the network processor 100, and the interface controller 112 may control communications via, e.g., a PCI bus (not shown).

Figure 2:
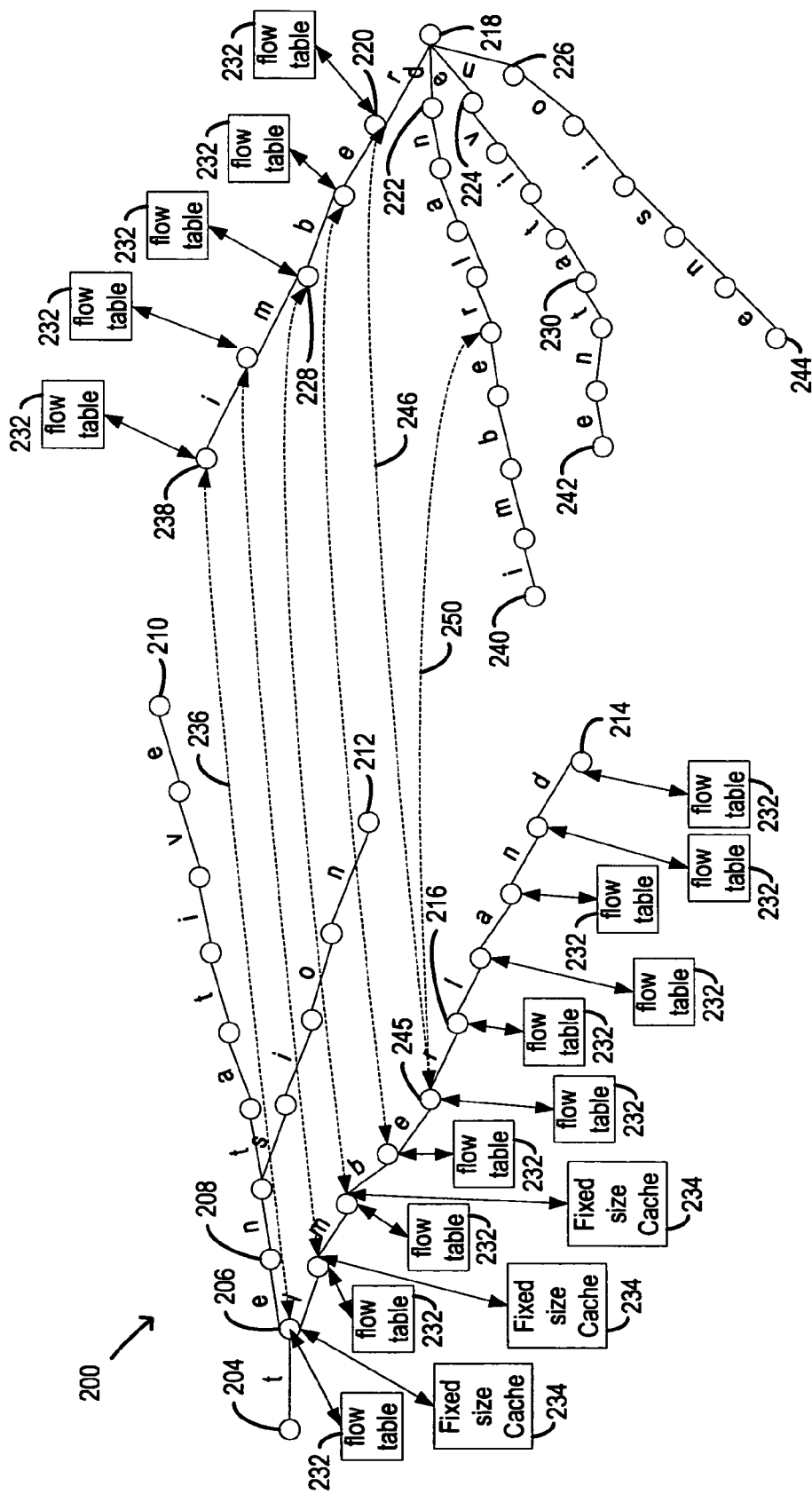
FIG. 2 is a schematic illustration of data structures (including a prefix trie and a suffix trie) that may be utilized in accordance with some embodiments for packet examination in the network controller of FIG. 1.

FIG. 2 schematically illustrates a prefix trie 200 and a suffix trie 202 that may be employed in some embodiments for the purpose of packet examination. As is familiar to those who are skilled in the art, a "trie" is a tree data structure that is useful for storing strings over an alphabet or other set of symbols. All strings that share a common stem hang off a common node.

For the purpose of the example shown in FIG. 2, it is assumed that the set of patterns to be detected consists of the words "timber", "timberland", "tentative" and "tension". For "timber" a comprehensive set of prefixes is {t, ti, tim, timb, timbe, timber} and a comprehensive set of suffixes is {imber, mber, ber, er, r}. For "timberland" a comprehensive set of prefixes is {t, ti, tim, timb, timbe, timber, timberl, timberla, timberlan, timberland} and a comprehensive set of suffixes is {imberland, mberland, berland, erland, rland, land, and, nd, d}. For "tentative" a comprehensive set of prefixes is {t, te, ten, tent, tenta, tentat, tentati, tentativ, tentative} and a comprehensive set of suffixes is {entative, ntative, tative, ative, tive, ive, ve, e}. For "tension" a comprehensive set of prefixes is {t, te, ten, tens, tensi, tensio, tension} and a comprehensive set of suffixes is {ension, nsion, sion, ion, on, n}. (It will be noted that for the embodiment of FIG. 2, the whole pattern is not considered to be a suffix.).

The prefix trie 200 begins with a root node 204 and continues from the beginnings of the patterns to the ends of the patterns, with a new node added at each byte of the pattern, and the prefix trie 200 branches at each point where two patterns diverge. Each node (other than the root node) represents a prefix made up of the bytes which are located along the path from the root node to the node in question. Thus node 206 represents the prefix "t", which is shared by all four patterns "timber", "timberland", "tentative" and "tension". Node 208 represents the prefix "te", which is common to the patterns "tentative" and "tension". Some, but not necessarily all, patterns may end at a leaf node such as nodes 210, 212, 214 shown in FIG. 2. By contrast, the pattern "timber" ends at node 216, but the pattern "timberland", which shares node 216 with "timber", continues on to the leaf node 214.

In the particular set of patterns used for this example, all patterns start with "t", so that the root node 204 has only a single child node (node 206). However, if the set of patterns includes patterns that start with various bytes, then the root node 204 has a respective child node for each different byte that starts a pattern.

The suffix trie 202 begins with a root node 218 and continues in a backwards direction from the ends of the patterns to one byte from the beginnings of the patterns. Again, a new node is added at each byte (in the backwards direction) of the pattern. In the particular example set of patterns, no two patterns share the same last letter. Accordingly, in this case, the root node 218 of the suffix trie 202 has a respective child node (nodes 220, 222, 224, 226) for each of the patterns. In the event that two or more patterns were to end in the same byte, at least one child node of the root node 218 of the suffix trie 202 would be shared by at least two patterns. If two or more patterns share a node, the suffix trie 202 would branch at each point where, proceeding in a backwards direction, the patterns diverge. Each node other than the root node 218 represents a suffix made up of the bytes which are located along the path from the root node to the node in question, but noting again that such a path contains the bytes in the reverse direction from the forward direction of the suffix. For example, node 228 represents the suffix "ber" of the pattern "timber", and node 230 represents the suffix "ative" of the pattern "tentative".

According to some embodiments, a respective flow table 232 is associated with each node (except possibly the root nodes and the leaf nodes of the prefix trie). The purpose and function of the flow tables will be described below. To simplify the drawing, many of the flow tables 232 are not shown. (For example, a respective flow table is associated with each of the nodes 208, 222, 224, 226, 230, but these flow tables are not indicated in the drawing.) In some embodiments the sizes of the flow tables may vary; for example, the deeper nodes (those farther from a root node) may have smaller flow tables. In some embodiments, for example, the size of the flow table may be established in accordance with the formula S=10*(10/d)+5, where S is the size of the flow table and d is the depth (distance from root) of the node in question.

In some embodiments, less deep nodes (e.g., the first three layers of nodes from the root nodes) may have associated therewith caches 234 in addition to the tables 232. (To simplify the drawing, many caches are not shown.) The purpose and function of the caches 234 will be described below.

Moreover, each node of the prefix trie 200 (except perhaps leaf nodes of the prefix trie and the root node 204 of the prefix trie) is linked to one or more corresponding nodes of suffix trie 202. By the same token, each node of the suffix trie (except perhaps the root node 218 of the suffix trie) is linked to one or more corresponding nodes of the prefix trie 200. Links between nodes are schematically illustrated in FIG. 2 by dashed-line two-headed arrow marks. For example, arrow mark 236 indicates a link between node 206 of the prefix trie to node 238 of the suffix trie. In general, each node in one of the tries is linked to all corresponding nodes of the other trie. A node in one trie is a corresponding node of a node in the other trie if and only if the prefix and suffix represented by the two nodes combine to exactly form one of the patterns. For example, the prefix "t" represented by node 206 of the prefix trie combines with the suffix "imber" represented by node 238 of the suffix trie to form the pattern "timber". Node 206 has three other corresponding suffix trie nodes, namely, node 240 (representing the suffix "imberland"), node 242 (representing the suffix "entative") and node 244 (representing the suffix "ension"). To simplify the drawing, the links between node 206 and each of the nodes 240, 242 and 244 are not indicated by two-headed arrow marks. For the same reason many other of the links between the two tries are not indicated.

To give but one other example, node 245 (representing the prefix "timbe") of the prefix trie has two corresponding nodes of the suffix trie, namely node 220 (representing the suffix "r"; link indicated by arrow mark 246) and node 248 (representing the suffix "rland"; link indicated by arrow mark 250).

The nature and function of the links between the tries 200 and 202 will be described further below.

Figure 3:
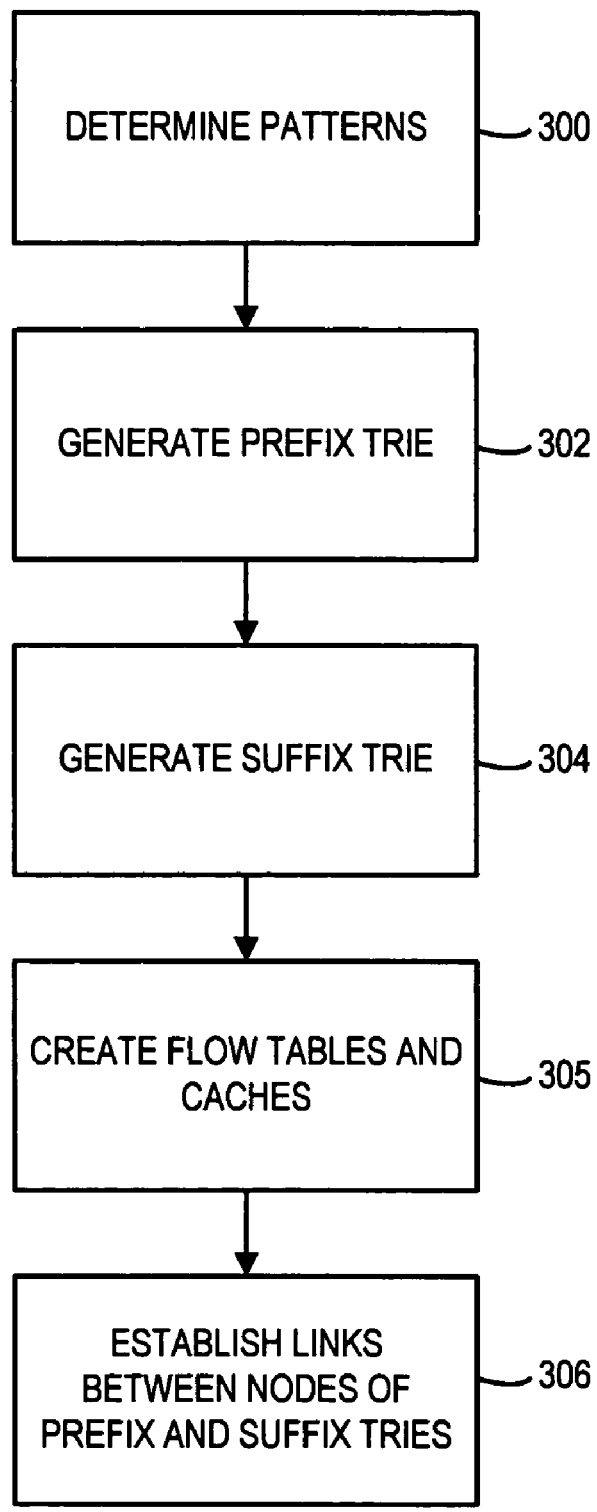
FIG. 3 is a flow chart that illustrates a process for generating the data structures of FIG. 2.

FIG. 3 is a flow chart that illustrates a process for generating the data structures shown in FIG. 2, including the tries 200 and 202. The process of FIG. 3 may be performed in a pre-processing mode of the network processor 100, i.e., before commencing packet examination.

At 300 in FIG. 3, the set of patterns to be detected in the data stream is established. At 302 the prefix trie 200 is generated based on the set of patterns established at 300, and at 304 the suffix trie is generated based on the set of patterns established at 300. (The process stages of 302 and 304 may be performed in any order or substantially simultaneously). Construction of the tries 200 and 202 can be accomplished in a straightforward manner, and generally entails comparing each pattern with the currently existing prefix or suffix trie, as the case may be, starting at the root node and branching where the pattern diverges from the currently existing trie. In the case of adding a pattern to the suffix trie, the matching and branching is performed from the end of the pattern toward the beginning.

At 305 in FIG. 3, the flow tables 232 and caches 234 (discussed above) are created.

At 306 in FIG. 3, respective links are established between nodes of the prefix trie and respective corresponding nodes of the suffix trie. (Equivalently, respective links may be established between nodes of the suffix trie and respective corresponding nodes of the prefix trie.) As noted above, a suffix trie node corresponds to a prefix trie node if the suffix and prefix represented by the nodes combine to exactly form a complete pattern.

Packet examination performed in accordance with some embodiments, and utilizing the linked prefix and suffix tries described above, will now be described with reference to FIGS. 4A and 4B.

Figure 4A:
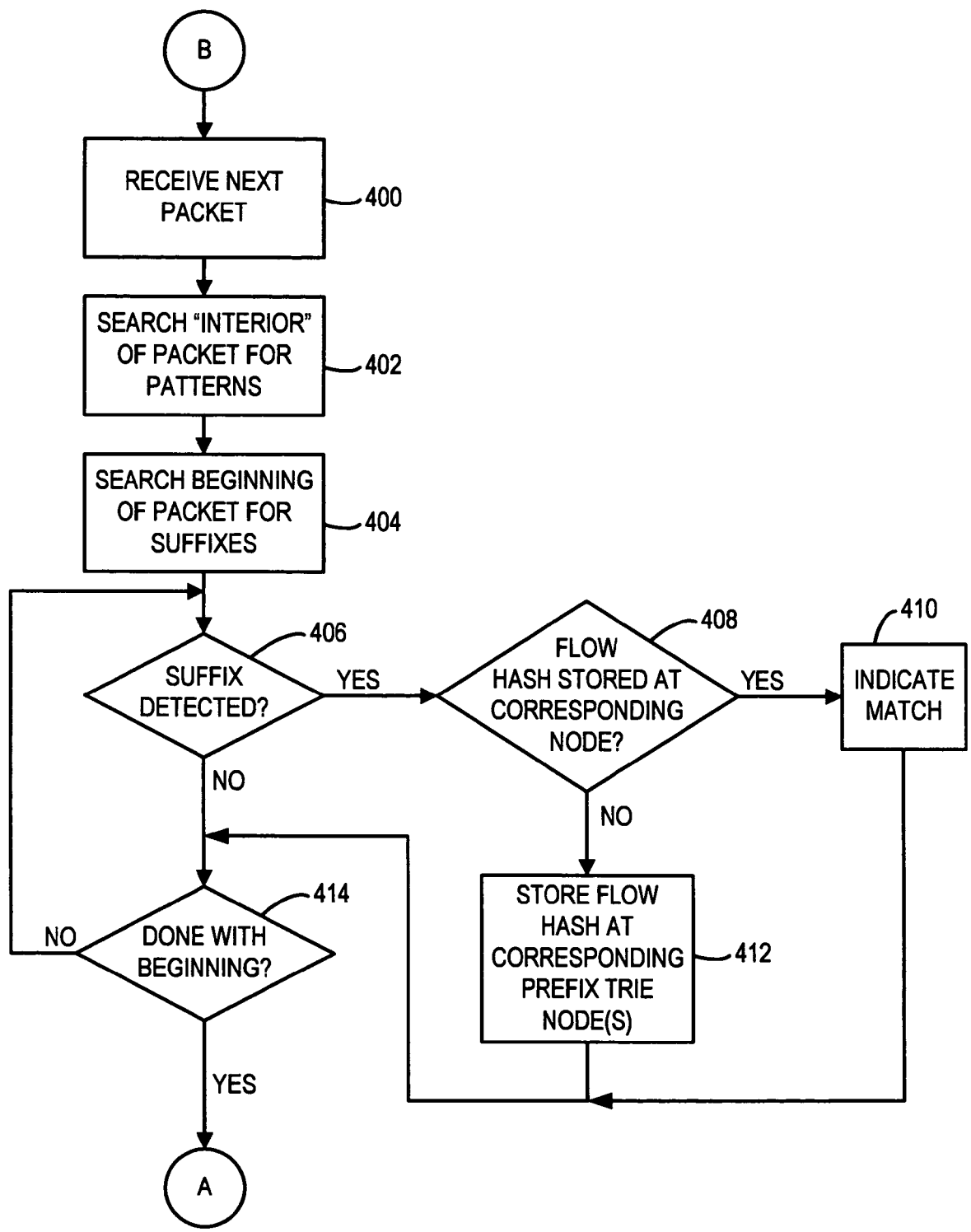
FIGS. 4A and 4B together form a flow chart that illustrates a process for detecting patterns in a data stream using the data structures of FIG. 2.

At 400 in FIG. 4A, the next packet of a data stream is received. At 402 the newly-received packet is searched to determine whether the packet contains one or more of the patterns in complete form. This may be done in a conventional manner and/or may involve use of the prefix trie. For example, it may be determined whether one or more strings in the packet completely match one or more branches of the prefix trie.

At 404, the suffix trie is utilized to determine whether the packet begins with a suffix or suffixes that are part of one or more of the patterns. This process stage operates on the first Lmax bytes of the packet payload, where Lmax is the length of the longest pattern. Assuming that the first byte in the packet payload is referred to as the $0^{th}$ byte, the examination of the beginning of the packet starts by scanning backwards from the (Lmax-1)th byte to the $0^{th}$ byte and comparing the resulting string with the suffix trie, starting from the root of the suffix trie. If a mismatch is detected, the search position is reset to the root of the suffix trie and the current byte is checked again. In each case when a suffix is detected, as indicated at decision stage 406, the flow table associated with the suffix trie node at which the string ends is examined to determine whether the flow table stores data (e.g., a hash of the source and destination) which is indicative of the flow with which the packet is associated. If so, this is an indication that the corresponding prefix has recently been detected at the end of a packet of the same flow. It is accordingly concluded that the pattern formed by the suffix and prefix has been detected, and an indication of pattern detection may then be made. (See 408 and 410 in FIG. 4A.)

If it is determined at 408 that the flow table associated with the suffix trie node at which the string ends does not store data indicative of the flow for the current packet, then, as indicated at 412, such data is stored in the respective flow table at each node of the prefix tree that is linked to (corresponds to) the suffix trie node at which the string ends. The entry of the flow data may be time-stamped to allow obsolete flow data to be flushed out after a suitable time delay deadline.

In some embodiments, a cache may be searched at the suffix trie node instead of or in addition to the flow table, particularly in the case of suffix trie nodes that correspond to shorter suffixes, to allow for more rapid searching for longer prefixes that were previously detected. By the same token, when matching flow data is not found at the suffix trie node flow table, flow data for the current packet may be stored in a cache, instead of or in addition to a flow table, at each prefix trie node that corresponds to the suffix trie node.

As indicated at 414 in FIG. 4A, searching for suffixes continues until all of the above described "backward" strings at the beginning of the packet have been compared with the suffix trie.

Figure 4B:
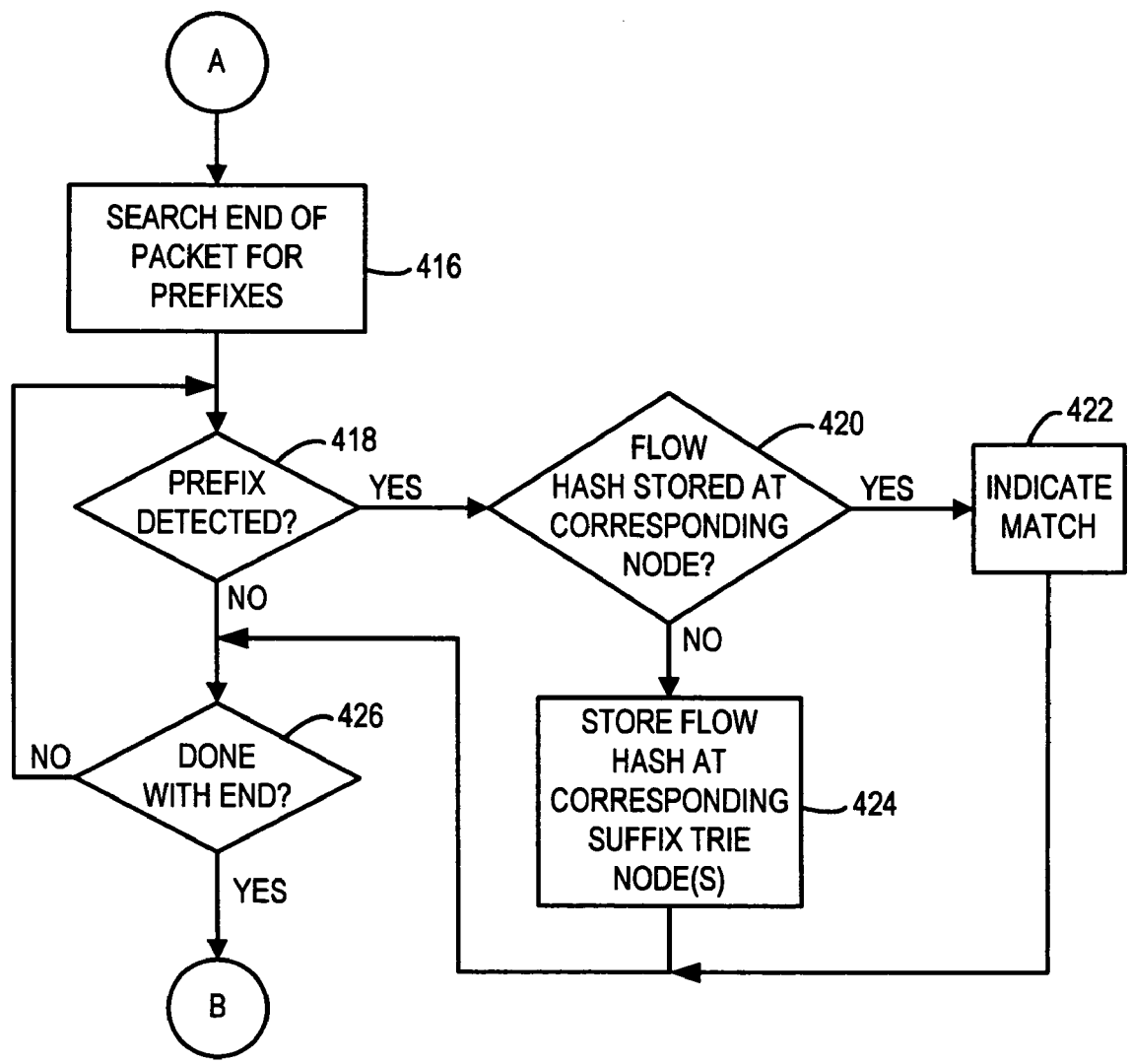

At 416 in FIG. 4B, the prefix trie is utilized to determine whether the packet ends with a prefix or prefixes that are part of one or more of the patterns. This process stage operates on the last Lmax bytes of the packet payload. The examination of the end of the packet starts by scanning forward from the (Lmax-1)th byte from the end of the packet to the last byte of the packet, and comparing the resulting string with the prefix trie, starting from the root of the prefix trie. If a mismatch is detected, the search position is reset to the root of the prefix trie and the current byte is checked again. In each case when a prefix is detected, as indicated at decision stage 418, the flow table associated with the prefix trie node at which the string ends is examined to determine whether the flow table stores data (e.g., a hash of the source and destination) which is indicative of the flow with which the packet is associated. If so, this is an indication that the corresponding suffix has recently been detected at the beginning of a packet of the same flow. It is accordingly concluded that the pattern formed by the prefix and suffix has been detected, and an indication of pattern detection may then be made. (See 420 and 422 in FIG. 4B.).

If it is determined at 420 that the flow table associated with the prefix trie node at which the string ends does not store data indicative of the flow for the current packet, then, as indicated at 424, such data is stored in the respective flow table at each node of the suffix trie that is linked to (corresponds to) the prefix trie node at which the string ends. Again, the entry of the flow data may be time-stamped to allow obsolete flow data to be flushed out.

In some embodiments, a cache may be searched at the prefix trie node instead of or in addition to the flow table, particularly in the case of prefix trie nodes that correspond to shorter prefixes, to allow for more rapid searching for longer suffixes that were previously detected. Also, when matching flow data is not found at the prefix trie node flow table, flow data for the current packet may be stored in a cache, instead of or in addition to a flow table, at each suffix trie node that corresponds to the prefix trie node.

As indicated at 426 in FIG. 4B, searching for prefixes continues until all of the above described strings at the end of the packet have been compared with the prefix trie. The next packet (400, FIG. 4A) may then be examined.

It should be understood that the order of prefix searching, suffix searching and full pattern searching may be varied from the order suggested by the flow chart of FIGS. 4A and 4B.

The packet examination technique described with reference to FIGS. 2-4B may be suitable for efficiently inspecting for a set of patterns that may be split between packets, without requiring flow reassembly at the examining device, and may deal efficiently with packets that arrive out of order or even in reverse order. This packet examination technique may also efficiently handle identification of patterns that are split between packets that are delayed in time. Furthermore, memory requirements for this technique are deterministic and are based on the number of patterns to be detected, which is bounded. With adequate provisions of flow table memory sizes, the risk of table overflow and resulting false negative determinations may be minimized. In some embodiments a very large number of packet flows may be inspected at the full data rate of the channel. Also this technique may be attractive for use in resource-constrained systems, and may enable applications such as augmented intrusion detection, context-aware firewalling, scanning for viruses and worms, application-aware routing and protection of personal and/or confidential information.

Figure 5:
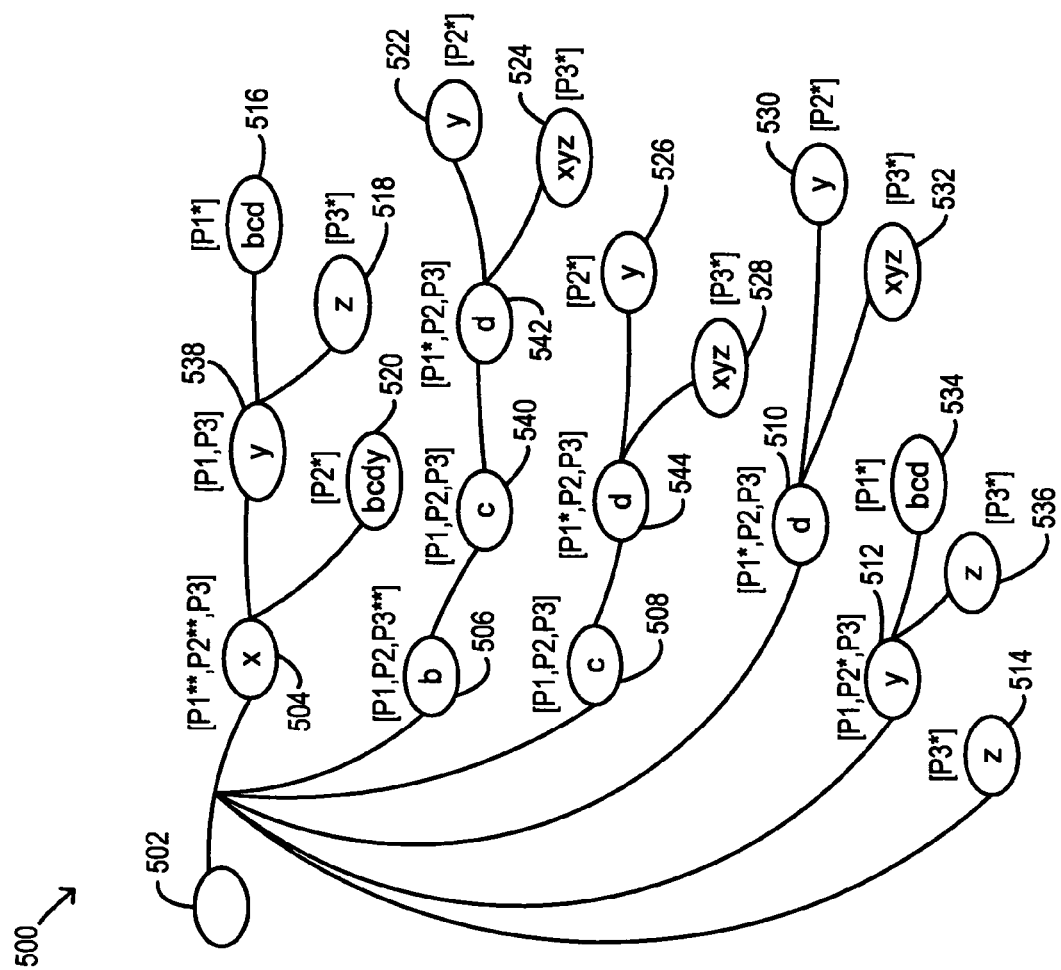
FIG. 5 is a schematic illustration of a data structure (shared suffix tree) that may be utilized in accordance with some other embodiments for packet examination in the apparatus of FIG. 1.

In other embodiments, another packet examination technique, and a different data structure, may be utilized in connection with packet examination. For example, FIG. 5 schematically shows an example of a shared suffix tree 500 that may be employed in some embodiments for packet examination. For the example tree 500 it is assumed that the following patterns are to be detected:

Pattern P1: "xybcd"
Pattern P2: "xbcdy"
Pattern P3: "bcdxyz"

A comprehensive set of suffixes for pattern P1 is {xybcd, ybcd, bcd, cd, d}. A comprehensive set of suffixes for pattern P2 is {xbcdy, bcdy, cdy, dy, y}. A comprehensive set of suffixes for pattern P3 is {bcdxyz, cdxyz, dxyz, xyz, yz, z}. (It is noted that for the purposes of the shared suffix tree of FIG. 5 the whole pattern is considered to be a suffix of the pattern. Thus a suffix may be the same as a pattern.).

The suffix tree 500 includes a root node 502 and a number of first level nodes 504, 506, 508, 510, 512, 514, which are child nodes of the root node 502. The suffix tree 500 also includes leaf nodes 516, 518, 520, 522, 524, 526, 528, 530, 532, 534, 536, which have no child nodes. Each leaf node corresponds either to a single byte or to a string of two or more bytes. (Note that the first level node 514, which has no child node, is also to be considered a leaf node. A first level node corresponds to a single byte, unless it is a leaf node, in which case it may alternatively correspond to a string of two or more bytes.)

Finally, the suffix tree includes intermediate nodes 538, 540, 542, 544, each of which has at least one child node and which is not a root node or a first level node. Each intermediate node corresponds to a single byte.

Associated with each node other than the root node 502 is at least one pattern identifier (in this example, P1, P2 and/or P3) which corresponds to a pattern having a suffix represented by a path in the suffix tree 500 that includes the node in question. Where the node corresponds to the start of a pattern, the pattern identifier at that node is suitably flagged (by the indicator "", in this example). The flag "" can only be associated with a first level node. See for example node 504, in which both P1 and P2 are flagged with "", and node 506, in which P3 is flagged with "". Where the node corresponds to the end of a pattern (and consequently the end of a suffix), the pattern identifier is also flagged, but with a different indicator (in this example, the indicator "*"). See for example node 542, in which P1 is flagged with "*", and node 512, in which P1 is again flagged with "*".

Each suffix for each one of the patterns is represented by a respective path through the suffix tree. In each case the path begins with a first level node. If the suffix is a single byte, or if the first level node is a leaf node, then the path also ends at the first level node, and the pattern identifier for the relevant pattern is flagged with "*". Alternatively, the path may end at a leaf node that is not a first level node, or at an intermediate node at which the relevant pattern identifier is flagged with "*".

As one example of a path, for the pattern P1 ("xybcd"), the corresponding path begins at node 504 (at which P1 is flagged with "") and continues through node 538 to end at node 516** (at which P1 is flagged with "*").

As another example, for the suffix "cdy", which is a suffix of pattern P2, the corresponding path begins at node 508 and continues through node 544 to end at node 526 (at which P2 is flagged with "*").

As still another example, for the suffix "bcd", which is a suffix of pattern P1, the corresponding path begins at node 506 and continues through node 540 to end at node 542 (at which P1 is flagged with "*").

As yet another example, for the suffix "z", which is the shortest suffix of pattern P3 (being the last byte of pattern P3), the corresponding path begins at, and ends immediately at, node 514.

In this embodiment, a flow state table is also provided, to keep track of detected fragments of patterns, as will be described further below.

Figure 6:
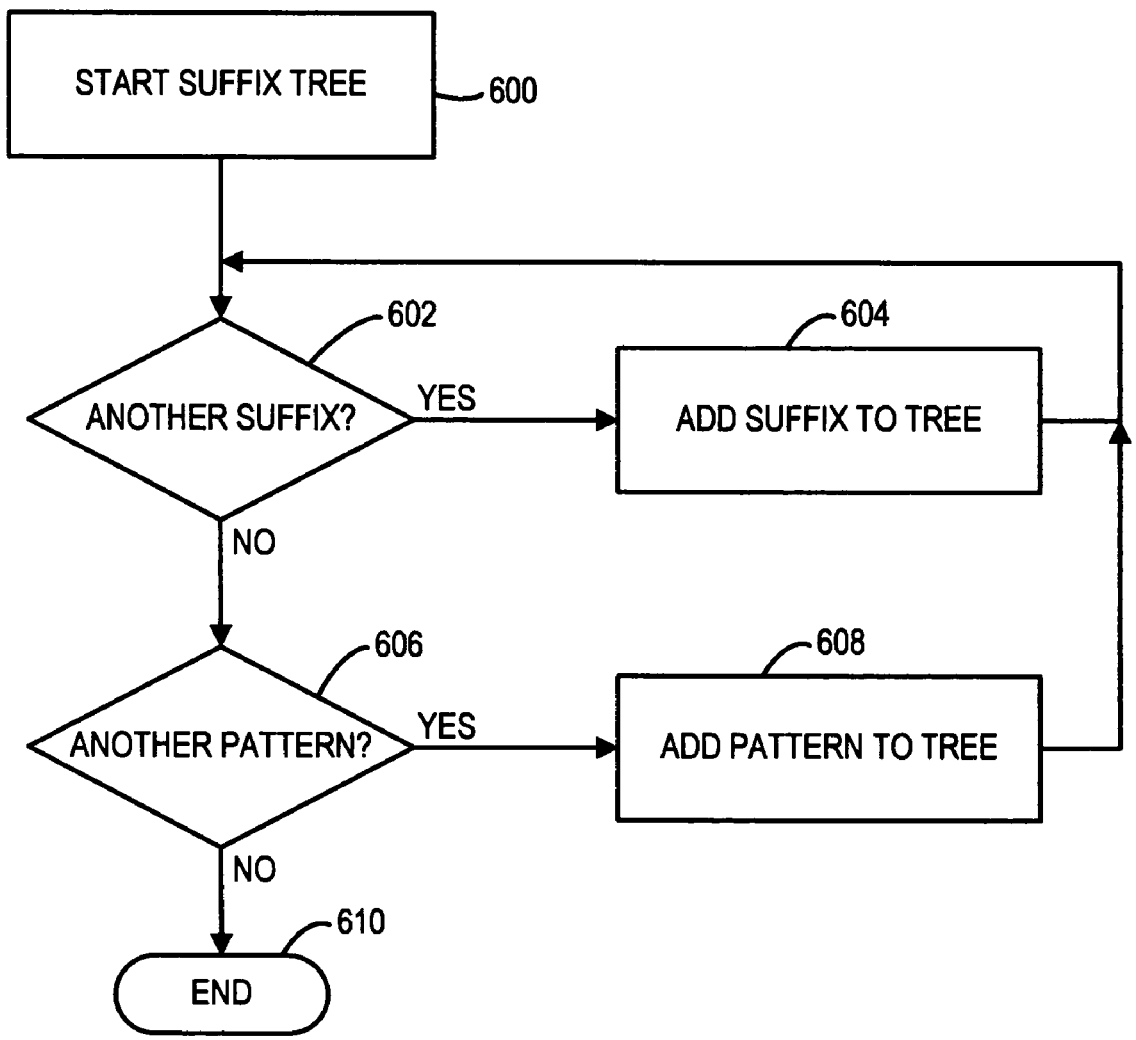
FIG. 6 is a flow chart that illustrates a process for generating the data structure of FIG. 5.

FIG. 6 is a flow chart that illustrates a process for generating the shared suffix tree 500. For the purposes of FIG. 6, it is assumed that a set of patterns has been established for detection using a suffix tree to be constructed from the patterns and their suffixes.

At 600 in FIG. 6, the suffix tree is started by, e.g., creating the root node and then creating a first level node that corresponds to the entirety of one of the patterns. Then, at 602 it is determined whether there is another suffix to be added to the tree for the current pattern. If so, then the suffix is added, as indicated at 604 (details of an operation for adding a suffix to the tree are provided below). If at 602 it is determined that no further suffix is to be added for the current pattern, it is next determined (as indicated at 606) whether any more patterns remain to be added to the tree. If so the pattern (i.e., the suffix that is the same as the pattern) is added to the tree, as indicated at 608 (details of an operation for adding a pattern to the tree are also provided below). After adding either a pattern or a suffix to a tree, the process of FIG. 6 loops back to 602. The process of FIG. 6 ends, as indicated at 610, once all suffixes for all patterns have been added to the tree.

Figure 7:
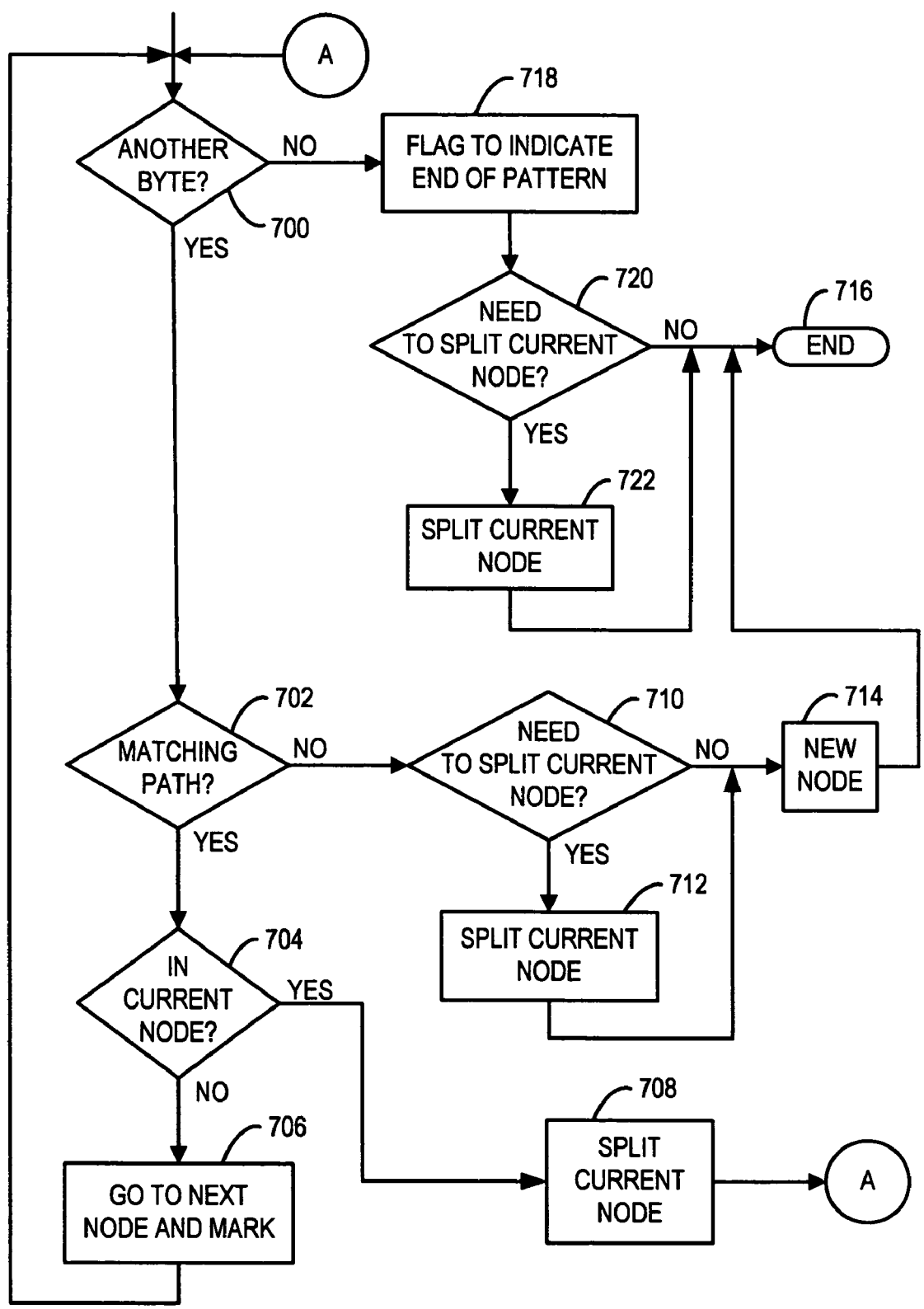
FIG. 7 is a flow chart that illustrates details of a stage of the process of FIG. 6.

FIG. 7 is a flow chart that illustrates details of an operation for adding a suffix to the tree 500, as indicated at 604 in FIG. 6.

At 700 it is determined whether there is another byte in the suffix (which may be the first byte of the suffix). If so, then it is determined (as indicated at 702) whether the tree, as it currently exists, provided a matching path to accommodate the next byte. More specifically, with respect to the first byte the suffix tree is searched for a child node of the root node that begins with the byte in question. For every subsequent byte, it is determined whether the next byte in the current node (if the current node is multibyte) matches the byte in question, or if there exists a child of the current node that starts with the byte in question. If at 702 it is determined that the suffix tree provides a matching path for the next byte, then it is determined (as indicated at 704) whether the matching path is represented in the current node of the tree. If not, as indicated at 706, then the process advances to the next node at which the matching path is provided, and that next node is marked with the pattern identifier that corresponds to the pattern of which the suffix currently being added is a part and the process loops back to 700.

Referring again to the determination made at 704, if it is determined at this stage that the matching path is represented in the current node of the tree (which can only be the case if the current node is a leaf node that corresponds to a string of at least two bytes), then the current node is split (as indicated at 708) by turning the current node into an intermediate node or a first level node that corresponds to only one byte and forming a new child (leaf) node that corresponds to the remaining byte or bytes of the string that was previously represented by the node now being split. The new child node is then marked with the pattern identifier that corresponds to the pattern of which the suffix currently being added is a part and the process then loops back to 700.

Referring again to the determination made at 702, if it is determined at this stage that the tree does not provide a matching path for the current byte at or from the current node, then it is determined (as indicated at 710), whether it is necessary to split the current node (i.e., it is determined whether the current node is a leaf node that represents a string of at least two bytes). If so, then, as indicated at 712, the current node is split by turning the current node into an intermediate node or a first level node that corresponds to only one byte and a new child (leaf) node is formed that corresponds to the remaining byte or bytes of the string that was previously represented by the node now being split. The intermediate or single-byte-first-level node continues to be marked with the pattern identifier for the suffix now being added, and the new child (leaf) node is not so marked. Then, as indicated at 714, a second new leaf node is created that is a child node of the intermediate or single-byte-first-level node formed at 712. The second new leaf node represents the current byte and any and all remaining bytes of the current suffix. The second new leaf node is marked with the pattern identifier for the pattern of which the suffix currently being added is a part, and that pattern identifier is flagged with the indicator "*" to indicate the end of the pattern. The operation to add the current suffix is then complete, as indicated at 716.

Referring again to the determination made at 700, if it is determined at this stage that there are no further bytes in the current suffix, then the indicator "*" is added to the current node, as indicated at 718. It is next determined, as indicated at 720, whether it is necessary to split the current node (i.e., it is determined whether the current node is a leaf node that represents a string of at least two bytes). If not, then the operation to add the current suffix is then complete. However, if a positive determination is made at 720, then the current node is split (as indicated at 722) by turning the current node into an intermediate node or a first level node that corresponds to only one byte and a new child (leaf) node is formed that corresponds to the remaining byte or bytes of the string that was previously represented by the node being split. The intermediate or single-byte-first-level node continues to be marked with the pattern identifier (and the indicator "*" for that identifier) for the suffix now being added, and the new child (leaf) node is not so marked. The operation to add the suffix is now complete.

The operation to add a pattern to the tree, as indicated at 608 in FIG. 6, is generally similar to the operation just described with reference to FIG. 7. In addition, when a pattern (i.e., a suffix that is identical to a pattern) is being added, in processing the first byte of the pattern, the first level node that matches the first byte (or the new first level node, if needed) is marked with the indicator "**" with respect to the pattern identifier for the new pattern.

For purposes of example, it will be assumed that an additional pattern P4, consisting of the string "cdzyx", is to be added to the tree 500 as it appears in FIG. 5. A comprehensive set of the suffixes for pattern P4 is {cdzyx, dzyx, zyx, yx, x}. The process to add pattern P4 and all of its suffixes to the shared suffix tree will now be described with reference to FIGS. 5 and 7 and to FIG. 8, which shows the shared suffix tree as it would appear after such a process is completed.

Initially the pattern "cdzyx" is added. That is, the first byte "c" is considered with positive determinations at 700 and 702 (FIG. 7) and with the root node 502 being the current node. A negative determination is made at 704 and matching first level node 508 (which corresponds to "c") is, as prescribed by 706 in FIG. 7, marked with the pattern identifier P4, which is also marked with the indicator "**", as indicated at 800 in FIG. 8. The next byte "d" is considered. Again positive determinations are made at 700 and 702 and a negative determination is made at 704. Accordingly, the next node is, as prescribed by 706, marked with the pattern identifier P4, as indicated at 802 in FIG. 8.

The next byte "z" is considered. A positive determination is made at 700, but a negative determination is made at 702, since no matching path for "z" is available in or from node 544. A negative determination is also made at 710, since node 544 is a single-byte node (indeed, node 544, not being a leaf node, has to be a single byte node). Consequently a new node 804 is formed, as prescribed by 714 in FIG. 7, as a child (leaf) node from node 544. The new node 804 corresponds to the string "zyx" which is the current byte "z" plus the remaining bytes in the pattern (suffix) now being added to the tree. In addition, the pattern identifier P4 is stored in association with the new node 804 and the flag or indicator "*" is stored in association with the pattern identifier P4.

The next suffix "dzyx" is then added to the tree. Initially the first byte "d" of the suffix is considered. Positive determinations are made at 700 and 702 and a negative determination is made at 704. Pursuant to 706, first level node 510 is marked with the pattern identifier P4. The next byte "z" is then considered. A positive determination is made at 700, but a negative determination is made at 702, since no matching path for "z" is available in or from node 510. A negative determination is also made at 710, since node 510 is a single-byte node. Consequently a new node 806 is formed as prescribed by 714, as a child (leaf) node from node 510. The new node 806 corresponds to the string "zyx" and is marked with P4 and "*".

The next suffix "zyx" is then added to the tree. Initially the first byte "z" of the suffix is considered. Positive determinations are made at 700 and 702 and a negative determination is made at 704. Pursuant to 706, first level node 514 is marked with the pattern identifier P4. The next byte "y" is then considered. A positive determination is made at 700, but a negative determination is made at 702, since no matching path for "y" is available in or from node 514. A negative determination is made at 710, since node 514 is a single byte node. Consequently a new node 808 is formed as prescribed by 714, as a child (leaf) node from node 514. The new node 808 corresponds to the string "yx" and is marked with P4 and "*".

The next suffix "yx" is then added to the tree. Initially the first byte "y" is considered. Positive determinations are made at 700 and 702 and a negative determination is made at 704. Pursuant to 706, first level node 512 is marked with the pattern identifier P4. The next byte "x" is then considered. A positive determination is made at 700, but a negative determination is made at 702, since no matching path for "x" is available in or from node 512. A negative determination is made at 710, since node 512 is a single-byte node. Consequently a new node 810 is formed as prescribed by 714, as a child (leaf) node from node 512. The new node 810 corresponds to the byte "x" and is marked with P4 and "*".

Figure 8:
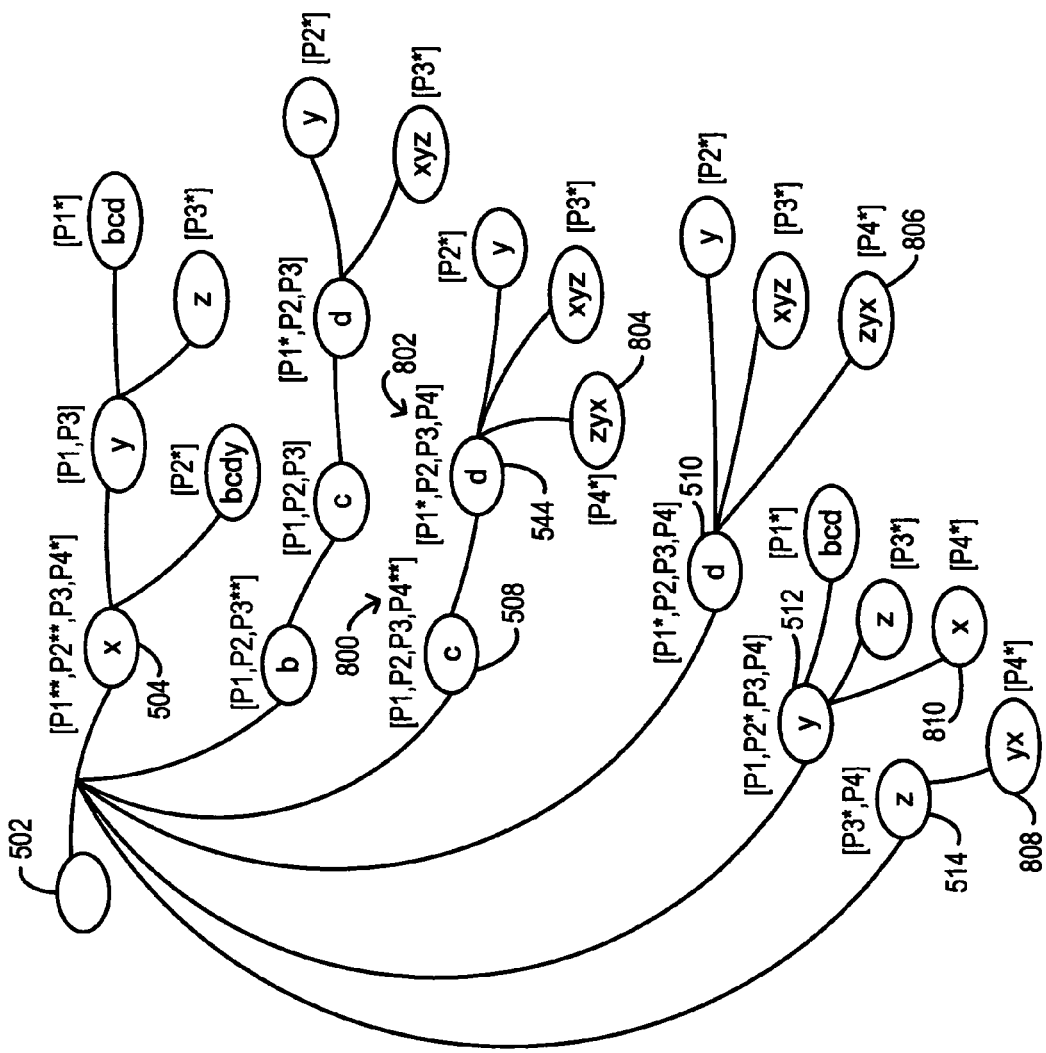
FIG. 8 is a revised version of FIG. 5, illustrating changes in the shared suffix tree as a result of adding the suffixes for an additional pattern to the shared suffix tree as shown in FIG. 5.

The final suffix "x" is then added to the tree. The byte "x" is considered and positive determinations are made at 700 and 702, but a negative determination is made at 704. Pursuant to 706, first level node 504 is marked with the pattern identifier P4. Since there is no other byte in the suffix, a negative determination is next made at 700. Pursuant to 718 the current node, which is node 504, is marked with "*". A negative determination is made at 720 (node 504 need not and cannot be split), and the operation to add the suffix "x" is complete, and so is the process required to add pattern P4 and all of its suffixes to the shared suffix tree. Again it is noted that FIG. 8 illustrates the condition of the shared suffix tree once pattern P4 and all of its suffixes have been added. It will be observed that the pattern identifier P4 has been added to nodes 504, 508, 544, 510, 512 and 514, and that new leaf nodes 804, 806, 808 and 810 have been added to the shared suffix tree.

In some embodiments, the flag or indicator "*" may be omitted from leaf nodes, since each leaf node inevitably represents the end of a pattern.

Figure 9:
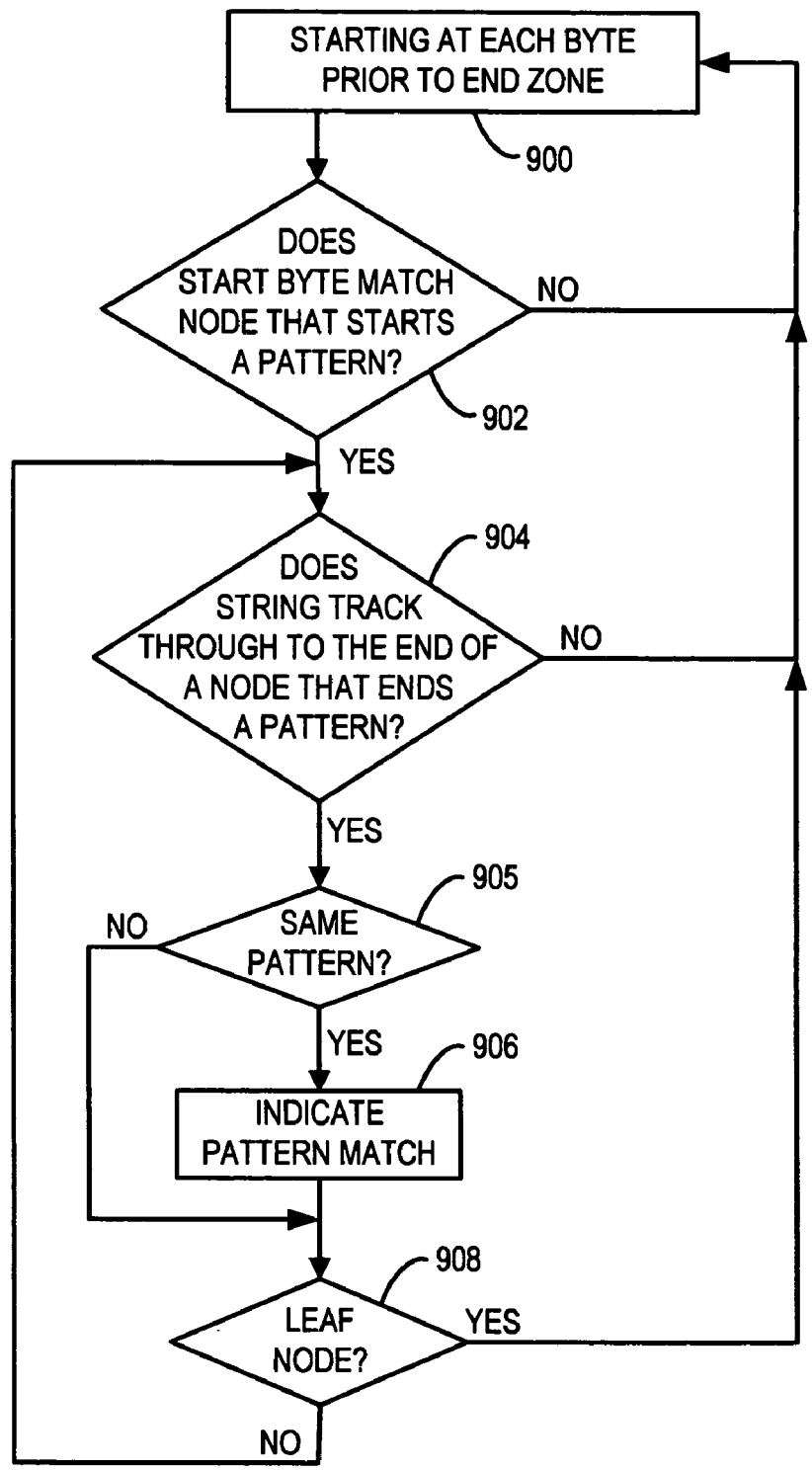
FIG. 9 is a flow chart that illustrates a process for detecting full patterns in a packet payload, using a data structure of the type shown in FIGS. 5 and 8.

FIG. 9 is a flow chart that illustrates a process for detecting full patterns in a packet payload, using a shared suffix tree of the type shown in FIGS. 5 and 8.

As indicated at 900, the process of FIG. 9 is applied successively starting at each byte of the packet payload prior to what will be called the "end zone" of the packet payload. The "end zone" may be considered to be the last Lmax bytes of the packet payload, where Lmax is the length of the longest pattern to be detected.

As indicated at 902, it is determined whether the current starting byte matches a first level node that is marked with the flag "**" which indicates that the first (usually the only) byte in the first level node starts a pattern. If not, the process loops back to start at the next byte in the packet.

If a positive determination is made at 902, bytes following the current starting byte in the packet are scanned to determine (as indicated at 904) whether the resulting string of bytes matches a path through the shared suffix tree that ends at the end of a node that is marked with the flag "*" which indicates the end of a pattern. If so, then it is next determined (as indicated at 905) whether the pattern identifier flagged with "*" matches the pattern identifier flagged with "**" at the first level node found at 902. If so, then a full pattern has been detected and an indication to that effect may be provided, as indicated at 906. If the current node is a leaf node, as determined next at 908, the process loops back for a new starting byte in the packet. Otherwise, the process loops back to 904.

Referring again to the determination made at 905, if it is determined that the pattern identifier flagged with "*" does not match the pattern identifier flagged with "**" at the first level node found at 902, then the process of FIG. 9 advances to 908 while bypassing 906.

Figure 10:
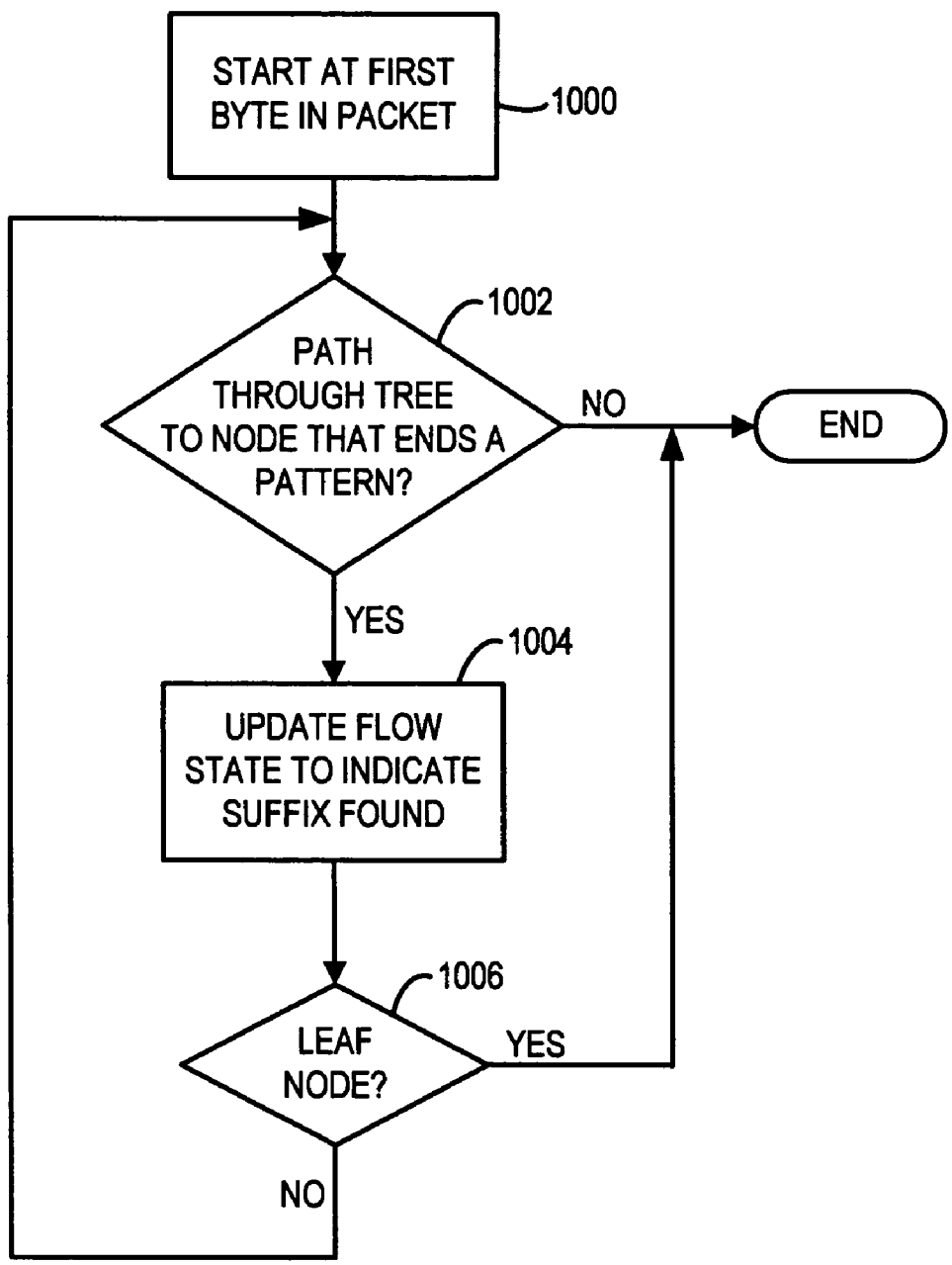
FIG. 10 is a flow chart that illustrates a process for detecting partial suffixes of patterns at the beginning of a packet payload using the data structure illustrated in FIG. 5.

FIG. 10 is a flow chart that illustrates a process for detecting pattern suffixes at the beginning of the packet payload using a shared suffix tree of the type illustrated in FIGS. 5 and 8.

As indicated at 1000, scanning of the packet payload begins with the first data byte of the packet. As indicated at 1002, it is determined whether the first packet byte matches a first level node in the suffix tree and whether the succeeding bytes match a path through the suffix tree that ends at the end of a node that is marked with the flag "*" which indicates the end of a pattern. If so, then a suffix from the pattern identified by the identifier marked with "*" has been detected. Accordingly, a state table for the flow with which the current packet is associated may be updated, as indicated at 1004. More specifically, the pattern identifier for the pattern may be stored in the state table, together with an indication of the length of the string at the beginning of the packet that matched the complete path through the tree.

If the current node is not a leaf node, as determined next at 1006, the process loops back to 1002, and the process continues to attempt to match further along the packet with a further path through the suffix tree. If a positive determination is made at 1006, the process of FIG. 10 ends. Similarly, the process ends without updating the flow state table if the start of the packet fails to match a complete path through the suffix tree.

Figure 11A:
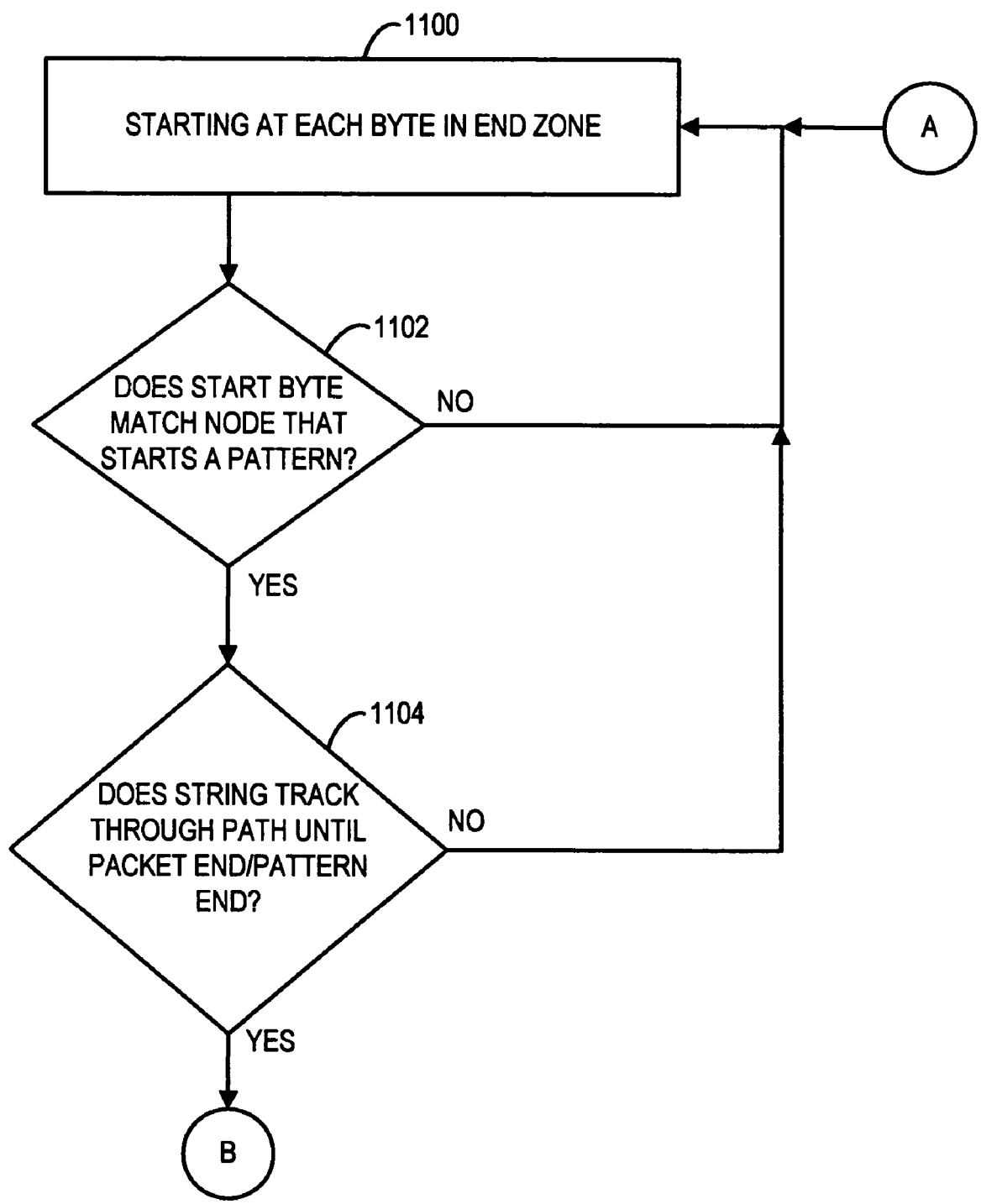
FIGS. 11A and 11B together form a flow chart that illustrates a process for detecting prefixes of patterns at the end of a packet payload using the data structure illustrated in FIG. 5.
Figure 11B:
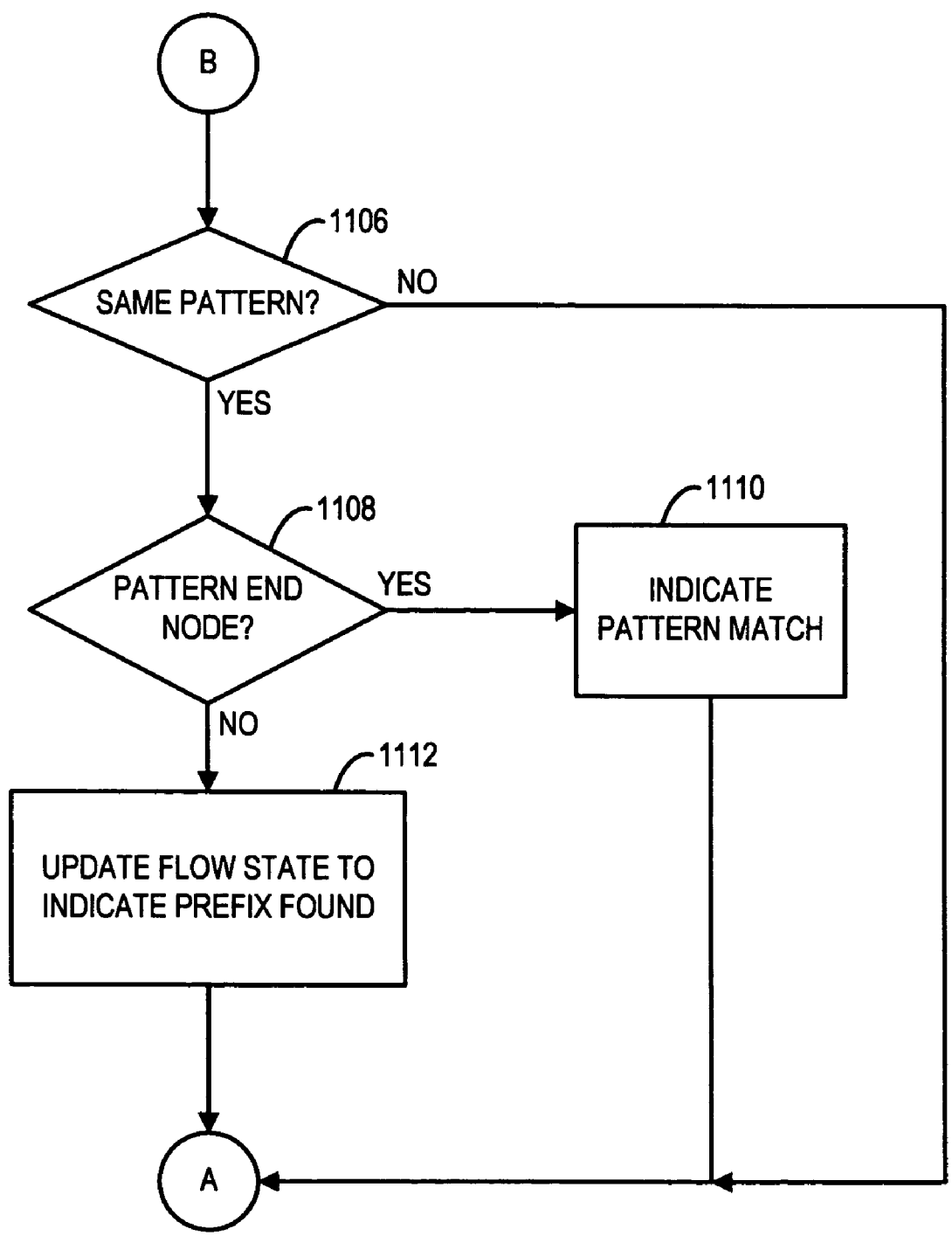

FIGS. 11A and 11B is a flow chart that illustrates a process for detecting prefixes of patterns at the end of a packet payload using a shared suffix tree of the type shown in FIGS. 5 and 8.

As indicated at 1100, the process of FIGS. 11A and 11B is applied successively starting at each byte in the end zone of the packet payload. As indicated at 1102, it is determined whether the current starting byte matches a first level node that is marked with the flag "**" which indicates that the first (usually the only) byte in the first level node starts a pattern. If not, the process loops back to start at the next byte in the packet.

If a positive determination is made at 1102, then, as indicated at 1104, it is determined whether the following bytes, continuing all the way to the end of the packet, match either a complete path through the suffix tree (i.e., a path that ends at the end of a node marked with the indicator "*") or a partial path through the suffix tree (i.e., a path that is not a complete path). If either one of these possibilities is the case, it is next determined, as indicated at 1106 (FIG. 11B), whether a pattern identifier at the end of the partial or complete path matches the pattern identifier flagged with "" at the first level node found at 1102. If a positive determination is made at 1106, then it is determined, as indicated at 1108, whether the path is a complete path. If such is the case, then a full pattern has been detected and an indication to that effect may be provided, as indicated at 1110**.

Referring again to the determination made at 1108, if it is determined that the path is not a complete path, then a partial suffix (i.e., a prefix, since the suffix was found to start a pattern) has been detected at the end of the packet. Accordingly, a state table for the flow with which the current packet is associated may be updated, as indicated at 1112. More specifically, the pattern identifier for the pattern may be stored in the state table, together with an indication of the length of the prefix that was detected. (In addition, the flow state table may be searched to determine if a complementary suffix for the pattern has previously been found. The length indications for the newly found prefix and for the previously found suffix may be used in determining that the prefix and suffix together form a complete pattern. If such is the case, an indication may be provided that the pattern has been detected. Similarly, at 1004 in FIG. 10, the flow state table may be searched to determine if a complementary prefix for the pattern has previously been found. Again, if such is the case, an indication may be provided that the pattern has been detected.) It is noted that more than one complete pattern and/or more than one prefix, or one complete pattern and one prefix, may be detected as a result of stages 1108, 1110, 1112. The decision of stage 1108 may be made with respect to each pattern identified with respect to the node at the end of the path.

The shared suffix tree described with reference to FIGS. 5-8 may be a particularly efficient way of storing suffixes for a set of patterns to be detected by deep packet examination. Moreover, such a suffix tree may make it possible to search for partial patterns at the beginning or end of packets in a highly efficient manner.

As will be appreciated by those who are skilled in the art, some or all of the processes of FIGS. 9-11B may be combined into a single process.

Some or all of the processes described herein may be performed by the network processor 100 of FIG. 1. In some embodiments, the processes are performed by operation of the processing unit 104, under control of suitable software instructions stored in the memory 108. In other embodiments, the processing unit may include suitable dedicated logic circuitry to perform some or all of the processes described herein.

Figure 12:
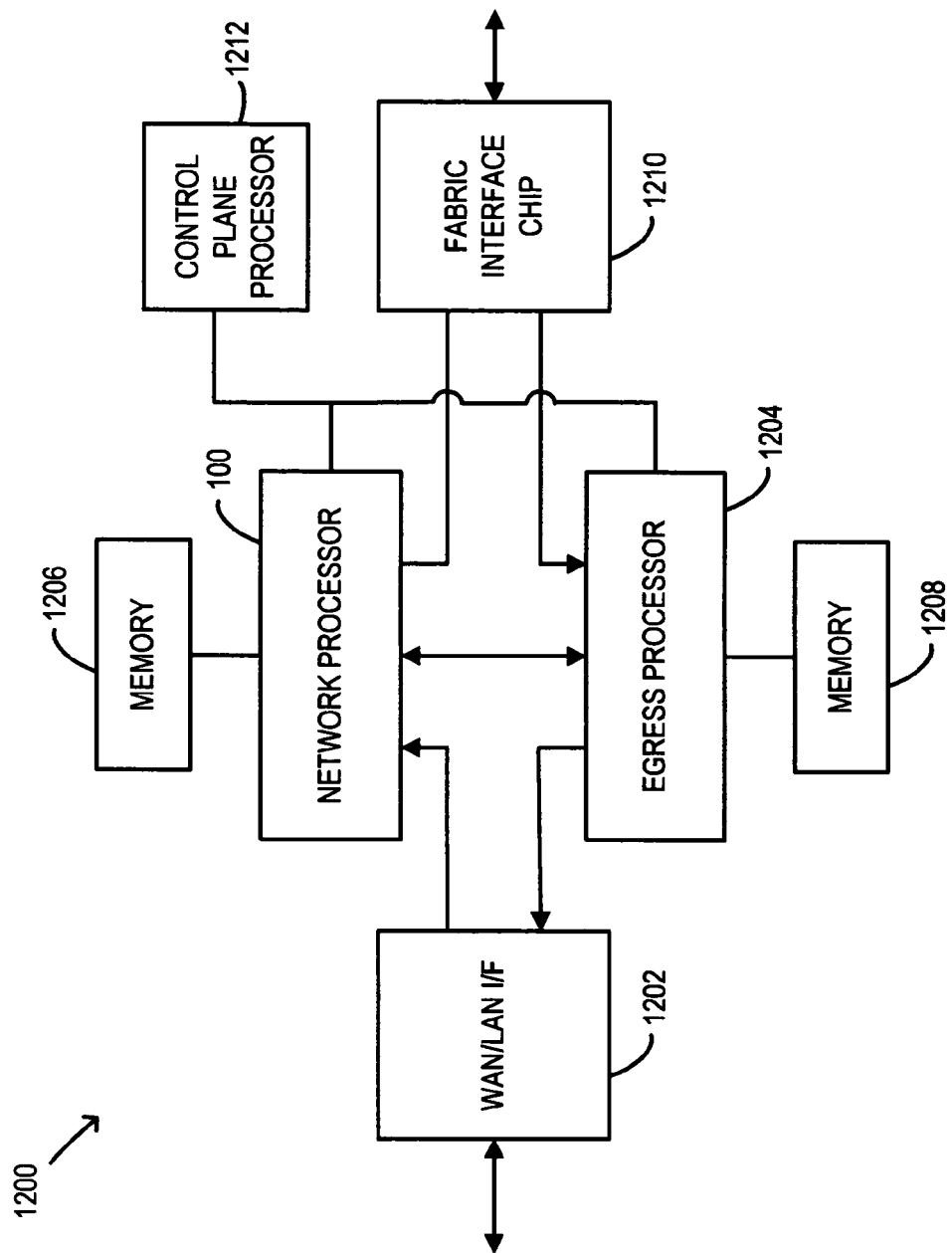
FIG. 12 is a block diagram that illustrates a system that incorporates the network controller of FIG. 1, in accordance with some embodiments.

FIG. 12 is a block diagram that illustrates a system 1200 that incorporates a network controller 100, in accordance with some embodiments. The system 1200 also includes an interface 1202 by which the system is coupled to a network (not shown) such as a Wide Area Network (WAN) or a Local Area Network (LAN). The network processor 100 manages packets inbound from the network and may perform deep packet examination in accordance with one or more processes described above. Also included in the system 1200 is an egress processor 1204 which manages outbound packets.

One or more memory components 1206 are connected to the network processor 100 to provide, e.g., storage for tables, queues and/or inbound packets. Also, one or more memory components 1208 are connected to the egress processor 1204 to provide, e.g., storage for tables, queues and/or outbound packets.

The system 1200 further includes a fabric interface chip 1210 that is coupled to the network processor 100 and to the egress processor 1204. The fabric interface chip 1210 provides an interface between the system 1200 and a switch fabric, which is not shown.

Also included in the system 1200 is a control plane processor 1212 which is coupled to the network processor 100 and to the egress processor 1204. The control plane processor 1212 may provide over-all control functions for the system 1200.

Some or all of the processes described herein may be performed by data communication devices other than network controllers.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:

generating a prefix trie for a set of patterns;

generating a suffix trie for the set of patterns;

establishing respective links between nodes of the prefix trie and respective corresponding nodes of the suffix trie;

detecting a prefix from a pattern of the set of patterns at an end of a data packet, the prefix corresponding to a node of the prefix trie; and in response to detecting the prefix, storing data in association with a node of the suffix trie;

wherein:

the node of the suffix trie in association with which the data is stored corresponds to the node of the prefix trie which corresponds to the detected prefix; and the stored data is indicative of a flow with which the data packet is associated.

2. The method of claim 1, wherein the stored data is a hash of source and destination data for the flow.

3. A method comprising:
generating a prefix trie for a set of patterns;
generating a suffix trie for the set of patterns;
establishing respective links between nodes of the prefix trie and respective corresponding nodes of the suffix trie;
detecting a suffix from a pattern of the set of patterns at a beginning of a data packet, the suffix corresponding to a node of the suffix trie; and
in response to detecting the suffix, storing data in association with a node of the prefix trie;
wherein:
the node of the prefix trie in association with which the data is stored corresponds to the node of the suffix trie which corresponds to the detected suffix; and
the stored data is indicative of a flow with which the data packet is associated.

4. The method of claim 3, wherein the stored data is a hash of source and destination data for the flow.

5. The method of claim 1, further comprising:
in response to detecting the prefix, determining whether data indicative of a flow with which the data packet is associated is stored in association with the node to which the prefix corresponds; and
in response to the data indicative of the flow with which the data packet is associated being found stored in association with the node to which the prefix corresponds, indicating that the pattern is detected in the flow with which the data packet is associated.

6. A method comprising:
generating a prefix trie for a set of patterns;
generating a suffix trie for the set of patterns;
establishing respective links between nodes of the prefix trie and respective corresponding nodes of the suffix trie;
detecting a suffix from a pattern of the set of patterns at a beginning of a data packet, the suffix corresponding to a node of the suffix trie;
in response to detecting the suffix, determining whether data indicative of a flow with which the data packet is associated is stored in association with the node to which the suffix corresponds; and
in response to the data indicative of the flow with which the data packet is associated being found stored in association with the node to which the suffix corresponds, indicating that the pattern is detected in the flow with which the data packet is associated.

7. An apparatus comprising:
a processor; and
a memory in communication with the processor;
the processor operative to:
generate a prefix trie for a set of patterns;
generate a suffix trie for the set of patterns;
establish respective links between nodes of the prefix trie and respective corresponding nodes of the suffix trie;
detect a prefix from a pattern of the set of patterns at an end of a data packet, the prefix corresponding to a node of the prefix trie; and
store data, in response to detecting the prefix, in association with a node of the suffix trie;
wherein:
the node of the suffix trie in association with which the data is stored corresponds to the node of the prefix trie which corresponds to the detected prefix; and
the stored data is indicative of a flow with which the data packet is associated.

8. An apparatus comprising:
a processor; and
a memory in communication with the processor;
the processor operative to:
generate a prefix trie for a set of patterns;
generate a suffix trie for the set of patterns;
establish respective links between nodes of the prefix trie and respective corresponding nodes of the suffix trie;
detect a suffix from a pattern of the set of patterns at a beginning of a data packet, the suffix corresponding to a node of the suffix trie; and
store data, in response to detecting the suffix, in association with a node of the prefix trie;
wherein:
the node of the prefix trie in association with which the data is stored corresponds to the node of the suffix trie which corresponds to the detected suffix; and
the stored data is indicative of a flow with which the data packet is associated.

9. The apparatus of claim 7, wherein the processor is further operative to:
determine, in response to detecting the prefix, whether data indicative of a flow with which the data packet is associated is stored in association with the node to which the prefix corresponds; and
indicate, in response to the data indicative of the flow with which the data packet is associated being found stored in association with the node to which the prefix corresponds, that the pattern is detected in the flow with which the data packet is associated.

10. An apparatus comprising:
a processor; and
a memory in communication with the processor;
the processor operative to:
generate a prefix trie for a set of patterns;
generate a suffix trie for the set of patterns;
establish respective links between nodes of the prefix trie and respective corresponding nodes of the suffix trie;
detect a suffix from a pattern of the set of patterns at a beginning of a data packet, the suffix corresponding to a node of the suffix trie;
determine, in response to detecting the suffix, whether data indicative of a flow with which the data packet is associated is stored in association with the node to which the suffix corresponds; and
indicate, in response to the data indicative of the flow with which the data packet is associated being found stored in association with the node to which the suffix corresponds, that the pattern is detected in the flow with which the data packet is associated.

11. A storage medium having stored thereon instructions that when executed by a machine result in the following:
generating a prefix trie for a set of patterns;
generating a suffix trie for the set of patterns;
establishing respective links between nodes of the prefix trie and respective corresponding nodes of the suffix trie;
detecting a prefix from a pattern of the set of patterns at an end of a data packet, the prefix corresponding to a node of the prefix trie; and
in response to detecting the prefix, storing data in association with a node of the suffix trie;

wherein:
the node of the suffix trie in association with which the data is stored corresponds to the node of the prefix trie which corresponds to the detected prefix; and
the stored data is indicative of a flow with which the data packet is associated.

12. A storage medium having stored thereon instructions that when executed by a machine result in the following:
generating a prefix trie for a set of patterns;
generating a suffix trie for the set of patterns;
establishing respective links between nodes of the prefix trie and respective corresponding nodes of the suffix trie;
detecting a suffix from a pattern of the set of patterns at a beginning of a data packet, the suffix corresponding to a node of the suffix trie; and
in response to detecting the suffix, storing data in association with a node of the prefix trie;
wherein:
the node of the prefix trie in association with which the data is stored corresponds to the node of the suffix trie which corresponds to the detected suffix; and
the stored data is indicative of a flow with which the data packet is associated.

13. The storage medium of claim 11, wherein the storage medium further has stored thereon instructions that when executed by a machine result in the following:
in response to detecting the prefix, determining whether data indicative of a flow with which the data packet is associated is stored in association with the node to which the prefix corresponds; and
in response to the data indicative of the flow with which the data packet is associated being found stored in association with the node to which the prefix corresponds, indicating that the pattern is detected in the flow with which the data packet is associated.

14. A storage medium having stored thereon instructions that when executed by a machine result in the following:
generating a prefix trie for a set of patterns;
generating a suffix trie for the set of patterns;
establishing respective links between nodes of the prefix trie and respective corresponding nodes of the suffix trie;
detecting a suffix from a pattern of the set of patterns at a beginning of a data packet, the suffix corresponding to a node of the suffix trie;
in response to detecting the suffix, determining whether data indicative of a flow with which the data packet is associated is stored in association with the node to which the suffix corresponds; and
in response to the data indicative of the flow with which the data packet is associated being found stored in association with the node to which the suffix corresponds, indicating that the pattern is detected in the flow with which the data packet is associated.

15. A system comprising:
a fabric interface chip; and
a network processor coupled to the fabric interface chip;
wherein the network processor includes:
a processing unit; and
a memory in communication with the processing unit;
the processing unit operative to:
generate a prefix trie for a set of patterns;
generate a suffix trie for the set of patterns;
establish respective links between nodes of the prefix trie and respective corresponding nodes of the suffix trie;
detect a prefix from a pattern of the set of patterns at an end of a data packet, the prefix corresponding to a node of the prefix trie; and
store data, in response to detecting the prefix, in association with a node of the suffix trie;
wherein:
the node of the suffix the in association with which the data is stored corresponds to the node of the prefix trie which corresponds to the detected prefix; and
the stored data is indicative of a flow with which the data packet is associated.

16. A system comprising:
a fabric interface chip; and
a network processor coupled to the fabric interface chip;
wherein the network processor includes:
a processing unit; and
a memory in communication with the processing unit;
the processing unit operative to:
generate a prefix trie for a set of patterns;
generate a suffix trie for the set of patterns;
establish respective links between nodes of the prefix trie and respective corresponding nodes of the suffix trie;
detect a suffix from a pattern of the set of patterns at a beginning of a data packet, the suffix corresponding to a node of the suffix trie; and
store data, in response to detecting the suffix, in association with a node of the prefix trie;
wherein:
the node of the prefix trie in association with which the data is stored corresponds to the node of the suffix trie which corresponds to the detected suffix; and
the stored data is indicative of a flow with which the data packet is associated.

17. The system of claim 15, wherein the processing unit is further operative to:
determine, in response to detecting the prefix, whether data indicative of a flow with which the data packet is associated is stored in association with the node to which the prefix corresponds; and
indicate, in response to the data indicative of the flow with which the data packet is associated being found stored in association with the node to which the prefix corresponds, that the pattern is detected in the flow with which the data packet is associated.

18. A system comprising:
a fabric interface chip; and
a network processor coupled to the fabric interface chip;
wherein the network processor includes:
a processing unit; and
a memory in communication with the processing unit;
the processing unit operative to:
generate a prefix trie for a set of patterns;
generate a suffix trie for the set of patterns;
establish respective links between nodes of the prefix trie and respective corresponding nodes of the suffix trie;
detect a suffix from a pattern of the set of patterns at a beginning of a data packet, the suffix corresponding to a node of the suffix trie;

determine, in response to detecting the suffix, whether data indicative of a flow with which the data packet is associated is stored in association with the node to which the suffix corresponds; and indicate, in response to the data indicative of the flow with which the data packet is associated being found stored in association with the node to which the suffix corresponds, that the pattern is detected in the flow with which the data packet is associated.

* * * * *